United States Patent [19]
Atkeisson et al.

[11] Patent Number: 5,533,161
[45] Date of Patent: Jul. 2, 1996

[54] WRAP AROUND FIBER OPTIC COMPONENT PACKAGE AND PACKAGING METHOD

[75] Inventors: Randal A. Atkeisson, Phoenix; Karl A. Fetting, Glendale, both of Ariz.

[73] Assignee: Honeywell Inc., Minneapolis, Minn.

[21] Appl. No.: 148,041

[22] Filed: Nov. 5, 1993

[51] Int. Cl.⁶ .................................................. G02B 6/255
[52] U.S. Cl. ..................... 385/99; 385/39; 385/42; 385/43; 385/51; 385/95; 385/96
[58] Field of Search .................. 385/15, 24, 39, 385/51, 53, 95, 96, 99, 100–114, 134–139, 147, 43

[56] References Cited

U.S. PATENT DOCUMENTS

| | | | |
|---|---|---|---|
| 4,355,865 | 10/1982 | Conrad et al. | 385/114 X |
| 4,468,089 | 8/1984 | Brorein | 385/114 X |
| 4,498,732 | 2/1985 | Campbell et al. | 385/95 |
| 4,580,874 | 8/1986 | Winter et al. | 385/99 |
| 4,730,894 | 3/1988 | Arroyo | 385/113 |
| 4,781,430 | 11/1988 | Tanaka | 385/77 |
| 4,868,967 | 9/1989 | Holt et al. | 29/450 |
| 4,968,109 | 11/1990 | Tanaka | 385/76 |
| 5,070,597 | 12/1991 | Holt et al. | 29/361 |
| 5,083,875 | 1/1992 | Cedrone | 385/139 |
| 5,148,508 | 9/1992 | Anjan et al. | 385/51 |
| 5,175,789 | 12/1992 | Libert et al. | 385/136 |
| 5,249,248 | 9/1993 | Arroyo et al. | 385/113 |
| 5,261,018 | 11/1993 | Suganuma et al. | 486/51 |
| 5,261,021 | 11/1993 | Pasta et al. | 385/100 |
| 5,263,104 | 11/1993 | Anjan et al. | 385/51 |

FOREIGN PATENT DOCUMENTS

| | | | |
|---|---|---|---|
| 106116 | 4/1984 | European Pat. Off. | G02B 7/26 |
| 124927 | 11/1984 | European Pat. Off. | G02B 7/26 |
| 343588 | 11/1989 | European Pat. Off. | G02B 6/28 |
| 479034 | 4/1992 | European Pat. Off. | 385/136 X |
| 541079 | 5/1993 | European Pat. Off. | 385/43 X |

OTHER PUBLICATIONS

Product Literature Copycode™ White Polyester and Technicote Product Specification, Jan. 1991.
Patent Abstracts of Japan, vol. 7, No. 57, p. 181 (1202) 9 Mar. 1983, JP,A,57 204,505 (Nippon, Denshin, Denwa).
WO, A, 93 04389 (Australian Optical Fibre Research Pty Ltd) "Packaging Fibre Optic Components" 4 Mar. 1993.

*Primary Examiner*—Brian Healy
*Attorney, Agent, or Firm*—Mark Gebhardt; Brian Downs; Ronald Champion

[57] ABSTRACT

A method resulting in a package for a fiber optic component includes positioning the fiber optic component within a primary protective body. A flat wrappable secondary protective material having an adhesive on one side thereof is then wrapped around the primary protective body a plurality of times. The flat wrappable secondary protective material may be marked prior to wrapping the primary protective body. The adhesive on the flat wrappable secondary protective material may include a pressure sensitive adhesive allowing the primary protective body to be unwrapped.

3 Claims, 2 Drawing Sheets

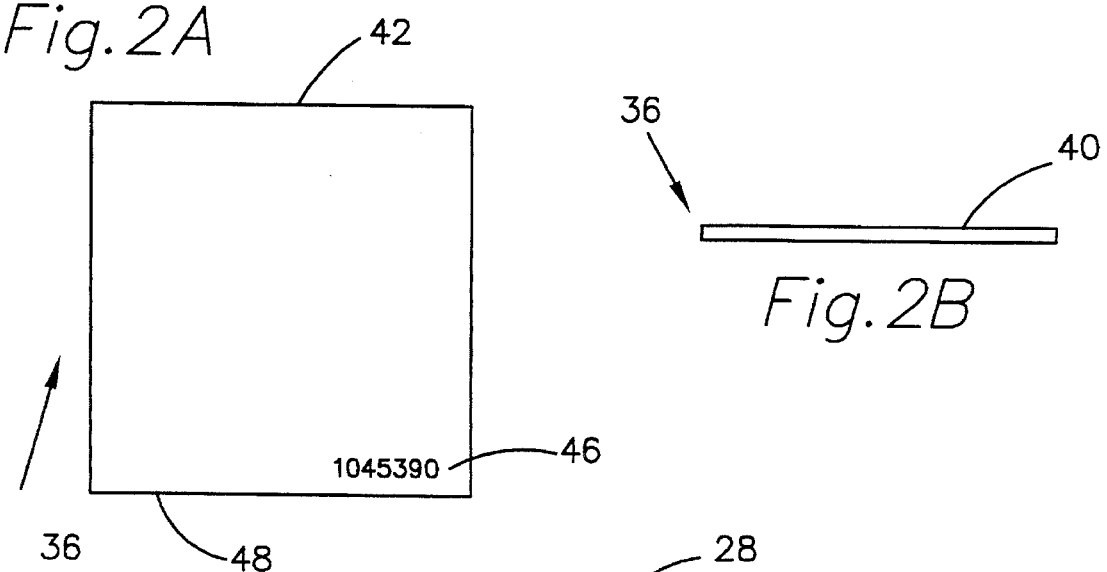
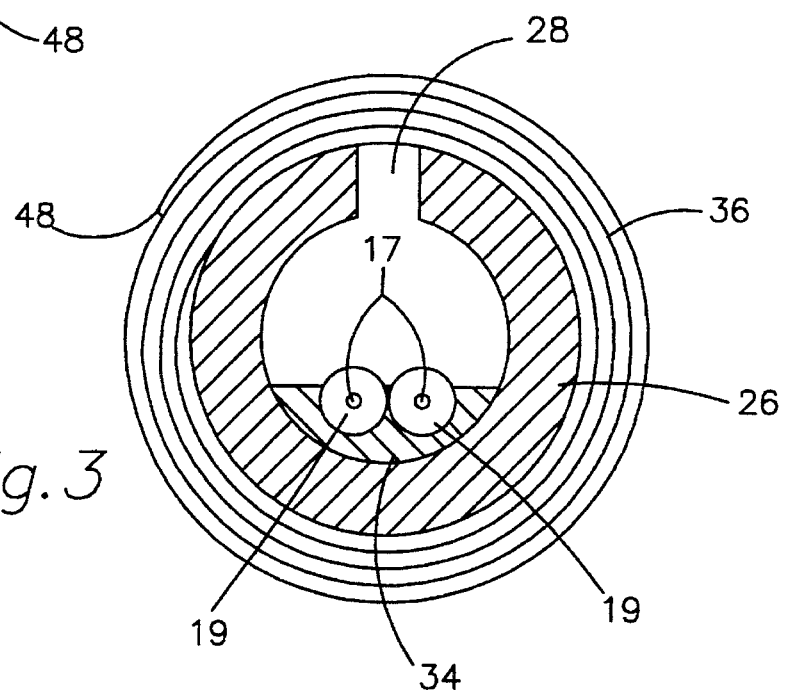
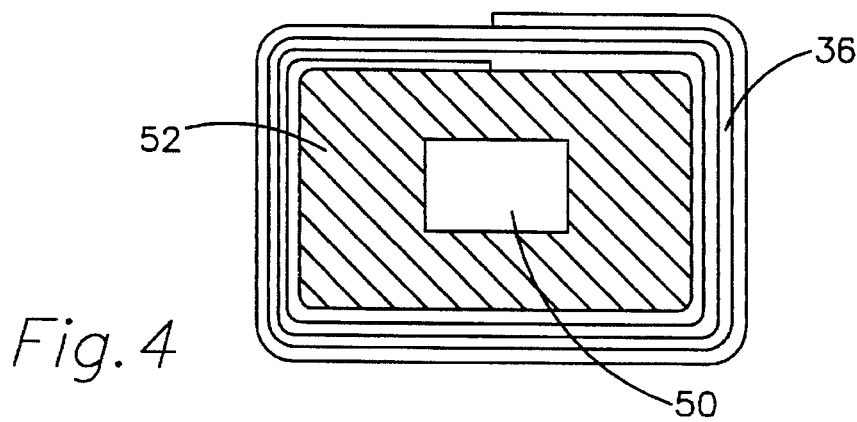

WRAP AROUND FIBER OPTIC COMPONENT PACKAGE AND PACKAGING METHOD

FIELD OF THE INVENTION

The present invention pertains generally to fiber optic components. More particularly, the present invention relates to a packaging design for fiber optic components.

BACKGROUND OF THE INVENTION

Most fiber optic components, such as fiber optic couplers and wavelength demultiplexers, are fragile components and need to be protected from environmental influences and other abuses both during use and during production thereof. For example, a fiber optic coupler which is used in optical fiber interconnection arrangements to couple electromagnetic waves from one of two or more optical fibers to another optical fiber in the group may be formed by fusing and tapering two or more optical fibers together. The fabrication usually involves aligning principle axes of two or more optical fibers after removing a portion of a protective jacket on the optical fibers. They are then brought together and heated to fuse and taper the optical fibers resulting in a fused and tapered coupled region for coupling of optical power. Such couplers have been used in optical communications, optical sensors, and fiber optic gyroscopes.

Generally, fiber optic components, and in particular fiber optic couplers, are very sensitive to environmental influences because the optical material of which the optical fibers are made is very fragile. In the case of the fiber optic coupler, the coupling region is not provided with a jacket so adverse environments influence the quality of the optical material of the fiber optic coupler and/or the signals transmitted through the fiber optic coupler. Therefore, the optical signal processing performance of fiber optic components in various environments typically depends upon the type of housing or package in which the component is positioned for protection and on the method used to assemble the packaged fiber optic component.

Packaging techniques which have been used to protect fiber optic components from deleterious environmental influences include the use of a glass protective body, for example, quartz glass tubes, as a primary protective covering. Such glass tubes, in particular, provide support for the coupled region of the fiber optic coupler. The coupled region is typically placed within a central open portion of the slotted quartz glass tube and epoxy is applied at the ends of the tube to secure the optical fibers extending from the coupled region. The glass protective body has also been protected secondarily with an encapsulating compound which is extremely messy to apply, or a stainless steel tube, which requires the tedious task of sliding the often lengthy input or output fibers of a fiber optic component through the tube before the tube can be affixed or mounted on the component. This sliding operation during production often leads to damage of the fiber leads or the component itself. Securing the stainless steel tube about the glass protective body with an adhesive is also a messy, time consuming process. The excess handling required to package such fiber optic components results in degradation to the fiber optic component capabilities and may also cause latent failure of the fiber optic component inside the glass container. In addition, the stainless steel tube packaging technique is not easily utilized with different shaped glass containers, for example, a square glass container.

Marking secondary protective coverings such as stainless steel tubes with product identification information has also been difficult. For example, the stainless steel tube is round and special machinery is necessary to mark such a shaped item. In addition, when encapsulating compounds or stainless steel tube techniques are utilized to package fiber optic components, repair or testing to determine failure is also difficult. Removal of the stainless steel tube from the fiber optic component or removal of the encapsulating compound results in additional component damage, reducing the effectiveness of failure analysis.

Techniques such as those discussed above for packaging fiber optic components leave much to be desired. The protection techniques available may cause damage to the fiber optic components during packaging, increase the handling required for packaging such components, reduce the effectiveness of failure analysis, and make identification marking of such components difficult. This is particularly true with regard to fiber optic couplers. Thus, it has been observed that the packaging techniques utilized present a severe limitation to the use of such packaged fiber optic components in communication applications. Therefore, an improved package and packaging method for fiber optic components is desired.

SUMMARY OF THE INVENTION

The present invention includes a method of packaging a fiber optic component having at least one lead portion extending therefrom. The method includes positioning the fiber optic component within a primary protective body. A flat wrappable secondary protective material having adhesive on one side thereof is then wrapped around the primary protective body a plurality of times.

In one embodiment of the method, the secondary protective material is marked with component identification information prior to wrapping the primary protective body. In another embodiment, the adhesive includes a pressure sensitive adhesive such that the flat wrappable secondary protective material can be unwrapped. In further embodiments of the method, the flat wrappable secondary protective material includes a paper or cloth-like material impregnated with strengthening fibers or a polyester material.

A package for a fiber optic component having at least one lead portion is also provided in accordance with the present invention. The package includes a primary protective body having a receiving space for positioning the fiber optic component therein with said lead portion extending through at least one opening thereof. A wrappable secondary protective material having adhesive on one side thereof is wrapped around said primary protective body a plurality of times resulting in a wrapper with at least one opening through which said at least one lead portion extends.

In further embodiments of the package, the secondary protective material includes a flat paper-like material impregnated with strengthening fibers or a polyester material. In another embodiment of the package, the adhesive on the secondary protective material is a pressure sensitive adhesive such that the secondary protective material can be unwrapped.

In alternative embodiments of the present invention, the primary protective body may be tube-like or rectangular in shape. In addition, the fiber optic component may be a fiber optic coupler formed of a plurality of optical fibers having

BRIEF DESCRIPTION OF THE DRAWINGS

FIG. 2A and FIG. 2B show a top and side view, respectively, of the wrapper utilized in the packaged fiber optic coupler of FIG. 1.

FIG. 3 shows an enlarged cross-sectional view at Line AA of the packaged fiber optic coupler of FIG. 1.

FIG. 4 shows an enlarged cross-sectional view of an alternative embodiment of the present invention with respect to a fiber optic component.

DETAILED DESCRIPTION OF THE PREFERRED EMBODIMENT

Figure 1:
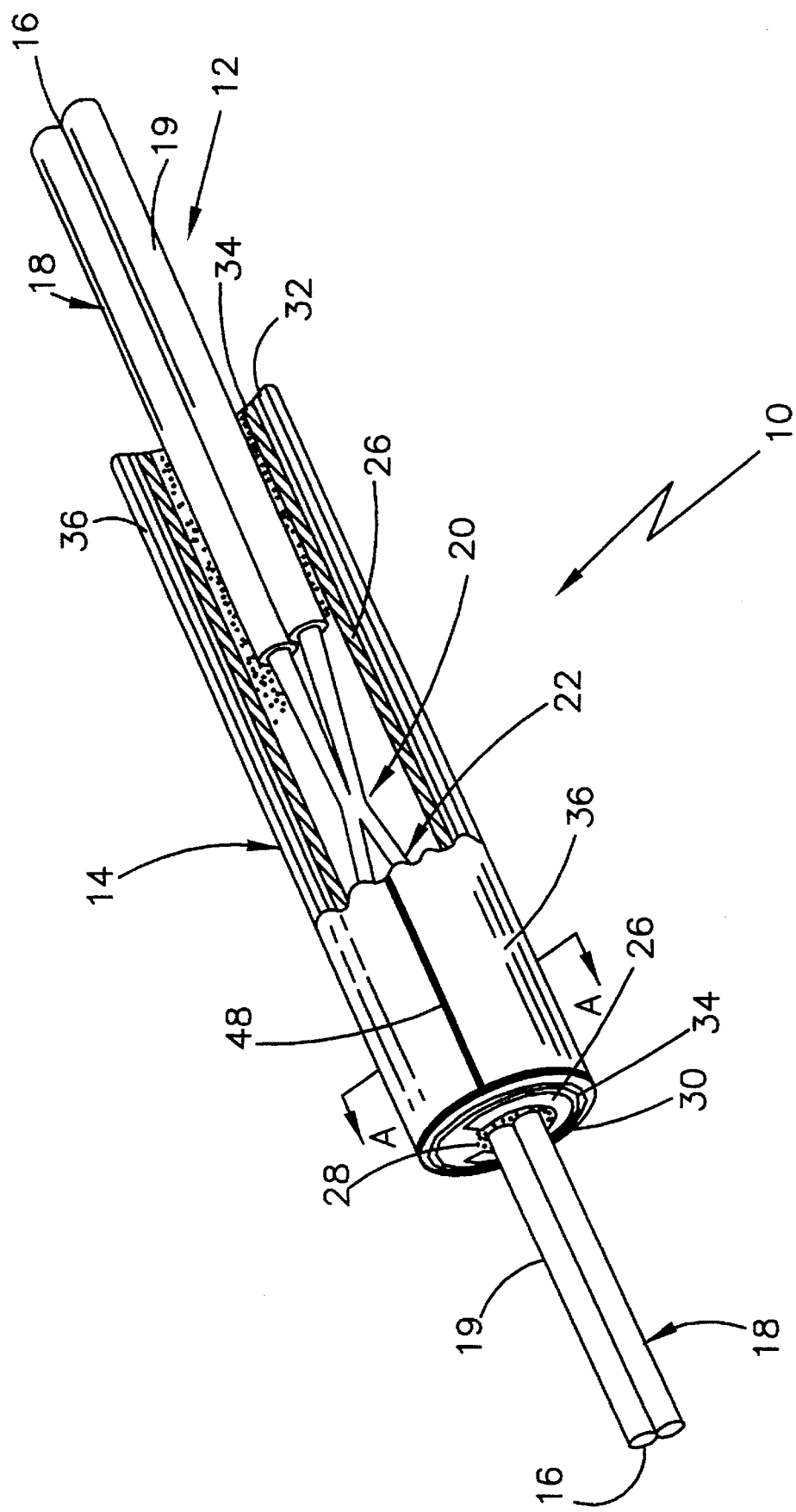
FIG. 1 shows a cutaway perspective view of a packaged fiber optic coupler in accordance with the present invention.

A packaged fiber optic coupler 10 and a method of packaging a fiber optic component, such as a fiber optic coupler 12, shall be described with reference to FIGS. 1–4. In general, the package and packaging method utilizes a wrapper 36, which is a polyester material or a flat paper-like or cloth-like material impregnated with strengthening fibers and which is wrapped around the fiber optic component, such as fiber optic coupler 12. One side of the wrapper 36, prior to being wrapped, has a pressure sensitive adhesive 40 applied thereto such that when the wrapper 36 is placed about the fiber optic component, it will immediately adhere thereto. This package and packaging method eliminates the need for messy potting compounds or separate mounting adhesive, and does not require excessive handling of the fiber leads. The package is easily placed on many different shaped fiber optic components, for example, round or square components. In addition, the wrapper can be marked with component identification information prior to being wrapped about the fiber optic component. This simplifies the marking process. The package and packaging method also enhances component failure analysis because use of the pressure sensitive adhesive allows the to wrapper to be unwrapped with a simple peel back starting at a second end 48 of the wrapper resulting in easy removal for examination or rework of the contents of the fiber optic component.

The packaged fiber optic coupler 10, FIG. 1, includes fiber optic coupler 12 and coupler package 14. Fiber optic coupler 12 includes optical fibers 16 having a jacket 19 thereon about fiber portions 17, FIG. 3. A portion of the jacket 19 is removed from a section of the optical fibers 16 such that a coupled region 20 is formed by a fusing and tapering process. Such a process may include any one of a number of techniques for creating the coupled region 20 known to those skilled in the art; the coupled region 20 allowing for coupling of optical power.

The fiber optic coupler 12, after removal of the jacket 19 for creation of the coupled region 20, includes jacketed lead portions 18, coupled region 20, and jacketless lead portions 22. As indicated in the Background of the Invention section herein, the packaging techniques for a fiber optic coupler and other components are inadequate in many manners. In order to counter such problems, the present invention provides a package and method of packaging for fiber optic components such as fiber optic coupler 12.

The coupler package 14 includes a primary protective body 26. In the preferred embodiment, the protective body 26 includes a quartz glass rod having a first end 30 and a second end 32. A slot 28 is provided along the entire length of the glass rod 26. The slot 28 is typically provided by cutting the wall of the glass rod 26 along its direction of elongation with a diamond saw. Slot 28 provides access to an interior receiving space within the rod 26 to allow fiber optic coupler 12 to be positioned therein. Openings at first end 30 and second end 32 of glass rod 26 allow for emergence of jacketed lead portions 18 therethrough. Glass rod 26 may also be a rectangular block having a receiving space therein and having an entrance for access to the receiving space. Any geometrical shape appropriate for providing a primary protective function for the fiber optic coupler 12 is contemplated in accordance with the present invention as defined by the accompanying claims.

The coupler package 14 also includes wrapper 36. As best shown in FIG. 2A and 2B, prior to use of the wrapper 36 for wrapping a fiber optic component such as fiber optic coupler 12, wrapper 36 includes a first end 42 and second end 48. A pressure sensitive adhesive 40, such as TS523 Adhesive, available from Technicore, Inc. is placed upon one side of the wrapper 36. The TS523 Adhesive is a tri-bond specialty clear acrylic having high initial tack, high shear and high ultimate adhesion. Also, prior to wrapping a fiber optic component with the wrapper 36, component identification information 46 may be marked thereon utilizing marking techniques known to one skilled in the art.

After the fiber optic coupler 12 is positioned within the receiving space of glass rod 26 through slot 28, the coupler 12 is held in place by an epoxy 34 at both the first end 30 and second end 32 of glass rod 26. The fiber optic coupler within the rod 26 is then placed at the first end 42 of wrapper 36. The fiber optic coupler 12 within the glass rod 26 is then rolled within wrapper 36 or the wrapper is wrapped about the glass rod 26 a number of times. The number of wraps depends upon the desired exterior dimensions of the packaged component. The pressure sensitive adhesive 40 on one side of the wrapper 36 adheres to the glass tube and also to the opposite side of the wrapper itself as the glass tube is being rolled or wrapped. Second end 48 forms a seam along the direction of elongation of the packaged fiber optic coupler 10 with the jacketed lead portions 18 extending through openings at each end of the package 14.

The wrapper 36 includes a polyester material. More particularly, the wrapper 36 includes Copycode™ White Polyester available from Sasson, Plainsville, Ohio. The small thickness of such material allows for a small material buildup when wrapping the fiber optic component which is important for restricted packaged component size. The material is also extremely flexible and capable of conforming to small and unique geometric shapes. The material is extremely receptive to common printing processes, making it easy to place custom markings thereon. In addition, the wrapper 36 may be of a paper or cloth-like material impregnated with strengthening fiber. This material may be Kevlar or TyVek, a product available from Dupont. One skilled in the art will recognize that other materials may be adequate and that the invention as described in the accompanying claims includes, but is not limited to those listed herein.

The rigid structural adhesive 34 may be ELC4481, available from Electro-Lite Corporation of Danbury, Conn. ELC4481 is an ultraviolet light curable adhesive. In addition, the rigid structural adhesive may be EPO-TEK®354T, a high temperature epoxy available from Epoxy Technology Inc., Billerica, Mass. EPO-TEK®354T is a thermally cured adhesive. Both EPO-TEK®354T or ELC4481 are utilized to suspend the fiber optic coupler 12 within the receiving space of glass rod 26 and also is worked into the ends in order to seal both the first end 30 and second end 32 of glass rod 26. The rigid structural adhesive 34 in addition to the wrapper 36 seal the fiber optic coupled region 20 within the package 14.

One skilled in the art will readily recognize that the packaging technique described herein, may be utilized with many fiber optic components, and is not restricted to a fiber optic coupler. For example, as shown in FIG. 4, fiber optic component 50 which may be built within a rectangular protection block 52 may also be wrapped by wrapper 36. Many geometrical shapes of primary protective bodies can be wrapped with the flexible wrapper 36. The wrapper can also be adapted to surround any lead portions extending from a particular fiber optic component.

As indicated previously, the wrapper 36 can be removed from the fiber optic component for rework or failure analysis thereof. Simply grasping second end 48 and unwrapping wrapper 36 therefrom accomplishes this task. The unwrapping procedure is facilitated through use of the pressure sensitive adhesive 40.

Those skilled in the art will recognize that only preferred embodiments of the present invention have been disclosed herein, that other advantages may be found and realized, and that various modifications may be suggested by those versed in the art. It should be understood that the embodiment shown herein may be altered and modified without departing from the true spirit and scope of the invention as defined in the accompanying claims.

What is claimed is:

1. A package for a fiber optic coupler formed of a plurality of optical fibers having a coupled region at which electromagnetic waves can be coupled therebetween and having at least one lead portion extending from said coupled region, said package comprising:

a primary protective body having a receiving space for receiving said coupled region and at least one opening through which said at least one lead portion extends; and a flat wrappable secondary protective material comprised of a flat paper or cloth-like material impregnated with strengthening fibers and having an adhesive on one side thereof wrapped around said primary protective body a plurality of times resulting in a wrapper with at least one opening through which said at least one lead portion extends.

2. A package for a fiber optic coupler formed of a plurality of optical fibers having a coupled region at which electromagnetic waves can be coupled therebetween and having at least one lead portion extending from said coupled region, said package comprising:

a primary protective body having a receiving space for receiving said coupled region and at least one opening through which said at least one lead portion extends; and a flat wrappable secondary protective material comprised of a polyester material and having an adhesive on one side thereof wrapped around said primary protective body a plurality of times resulting in a wrapper with at least one opening through which said at least one lead portion extends.

3. A package for a fiber optic coupler formed of a plurality of optical fibers having a coupled region at which electromagnetic waves can be coupled therebetween and having at least one lead portion extending from said coupled region, said package comprising:

a primary protective body having a receiving space for receiving said coupled region and at least one opening through which said at least one lead portion extends; and a flat wrappable secondary protective material having a pressure sensitive adhesive on one side thereof such that said secondary protective material can be unwrapped, said secondary protective material wrapped around said primary protective body a plurality of times resulting in a wrapper with at least one opening through which said at least one lead portion extends.

* * * * *